(12) United States Patent  (10) Patent No.: US 7,974,754 B2
Nakatsu  (45) Date of Patent: Jul. 5, 2011

(54) VEHICLE STEERING CONTROL SYSTEM (75) Inventor: Masatoshi Nakatsu, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 280 days.

(21) Appl. No.: 12/443,696

(22) PCT Filed: Apr. 9, 2008

(86) PCT No.: PCT/IB2008/000860
§ 371 (c)(1),
(2), (4) Date: Mar. 31, 2009

(87) PCT Pub. No.: WO2008/125944
PCT Pub. Date: Oct. 23, 2008

(65) Prior Publication Data
US 2010/0004823 A1 Jan. 7, 2010

(30) Foreign Application Priority Data

Apr. 11, 2007 (JP) ................................. 2007-103870

(51) Int. Cl.
G05D 1/00 (2006.01)
B62D 5/04 (2006.01)
F16H 33/00 (2006.01)

(52) U.S. Cl. ................ 701/41; 701/42; 701/43; 701/44; 701/51; 701/61; 180/443; 180/444; 74/640; 74/411.5

(58) Field of Classification Search ........................ None
See application file for complete search history.

(56) References Cited

U.S. PATENT DOCUMENTS

| 6,164,150 | A  | * | 12/2000 | Shindo et al. | 74/388 PS |
| 6,569,049 | B1 | * | 5/2003  | Folsom et al. | 475/72 |
| 6,578,862 | B2 | * | 6/2003  | Park et al. | 280/444 |
| 6,718,242 | B1 | * | 4/2004  | Mori et al. | 701/41 |
| 6,848,535 | B2 | * | 2/2005  | Yamamori et al. | 180/444 |
| 7,303,045 | B2 | * | 12/2007 | Yamamori et al. | 180/444 |
| 7,306,535 | B2 | * | 12/2007 | Menjak et al. | 475/29 |

FOREIGN PATENT DOCUMENTS

| DE | 10 2005 027 535 | 1/2007 |
| JP | 2003 306155     | 10/2003 |
| JP | 2005 14680      | 1/2005 |
| JP | 2005 162124     | 6/2005 |
| SU | 1138570         | 2/1985 |
| WO | 2005 110833     | 11/2005 |

* cited by examiner

Primary Examiner — Khoi Tran
Assistant Examiner — Ian Jen
(74) Attorney, Agent, or Firm — Oblon, Spivak, McClelland, Maier & Neustadt, L.L.P.

(57) ABSTRACT

A vehicle steering control system includes a variable transmission ratio device that rotates an output shaft relative to an input shaft so as to change the transmission ratio, and a locking device that is switched between a lock-on state in which the transmission ratio between the input shaft and the output shaft is inhibited from being changed and a lock-off state in which the transmission ratio between the input shaft and the output shaft is allowed to be changed. The variable transmission ratio device includes an electric motor and a speed reduction mechanism. The locking device inhibits the input shaft and a rotor of the electric motor from rotating relative to each other when placed in the lock-on state, and allows the input shaft and the rotor to rotate relative to each other when placed in the lock-off state.

14 Claims, 3 Drawing Sheets

VEHICLE STEERING CONTROL SYSTEM

BACKGROUND OF THE INVENTION

1. Field of the Invention

The invention relates to a steering control system of a vehicle, such as an automobile, and more particularly to a vehicle steering control system including a variable transmission ratio device operable to change the steering transmission ratio or gear ratio.

2. Description of the Related Art

As one type of steering control system of a vehicle, such as an automobile, a steering control system including a variable transmission ratio device operable to change the steering transmission ratio is known. This type of steering control system generally includes an input shaft that is rotatably supported and engages with the steering wheel so as not to rotate relative to the steering wheel, an output shaft that is rotatably supported, a motion conversion mechanism that converts rotary motion of the output shaft into a motion that changes the steering angle of steerable road wheels, and a variable transmission ratio device that rotates the output shaft relative to the input shaft so as to change the transmission ratio as the ratio of the amount of rotary motion of the output shaft to the amount of rotary motion of the input shaft.

While variable transmission ratio devices having various constructions have been proposed, a variable transmission ratio device including an electric motor and a speed reduction mechanism is well known. The electric motor has a stator, and a rotor that is driven by rotor driving torque generated from interactions between the rotor and the stator and is rotated relative to the stator, and the speed reduction mechanism includes a rotator that rotates along with the rotor. The variable transmission ratio device is arranged to operate in the following manner: when the rotator rotates relative to the input shaft by a first rotational angle, the output shaft rotates relative to the input shaft by a second rotational angle that is different from the first rotational angle, and, when the rotator does not rotate relative to the input shaft, the output shaft does not rotate relative to the input shaft.

While control current needs to be supplied to the electric motor so as to control the variable transmission ratio device, a spiral cable for supplying control current from the vehicle body side to the electric motor is needed in the case where the electric motor is incorporated in the steering column. To eliminate the need for the spiral cable, there is also known a variable transmission ratio device constructed such that the stator is fixed to the vehicle body and control current is supplied to the stator.

In the steering control system having the variable transmission ratio device, a locking device is provided so that the variable transmission ratio device performs control for changing the transmission ratio with reliability when the variable transmission ratio device is in a normal operating condition, and so that the rotary motion and torque are surely transmitted between the input shaft and the output shaft when an abnormality occurs in the variable transmission ratio device, as disclosed in, for example, Japanese Patent Application Publication No. 2005-162124 (JP-A-2005-162124) and Japanese Patent Application Publication No. 2005-14680 (JP-A-2005-14680). The locking device is switched between a lock-off state that allows changes in the transmission ratio between the input shaft and the output shaft, and a lock-on state that inhibits changes in the transmission ratio between the input shaft and the output shaft.

As one type of speed reduction mechanism of the variable transmission ratio device, a strain wave gearing mechanism (as disclosed in, for example, JP-A-2005-14680) is well known. This mechanism has a first ring gear member that rotates with the input shaft, a second ring gear member that rotates with the output shaft, and a band-like external-teeth gear member that is mounted around an elliptic rotator that rotates with the rotor of the electric motor, and is rotatable relative to the rotator. The external-teeth gear member meshes with the first and second ring gear members at positions corresponding to the long diameter of the ellipse of the rotator. The number of teeth of the external-teeth gear member is equal to that of one of the first and second ring gear members, and is different from that of the other of the first and second ring gear members. In operation, the rotator is driven by the electric motor and rotated relative to the input shaft, so that the transmission ratio is changed.

Generally, the locking device of the steering control system having the strain wave gearing mechanism as described above, when placed in the lock-on state, inhibits relative rotation of the rotor and the stator so as to inhibit rotation of the rotator, thereby to inhibit changes in the transmission ratio between the input shaft and the output shaft. When the locking device is in the lock-on state, the rotator does not rotate, and rotation of the first ring gear member due to rotation of the input shaft causes the external-teeth gear member to be rotated around the rotator. The rotation of the external-teeth gear member is transmitted to the output shaft via the second ring gear member, so that the rotary motion and torque of the input shaft are transmitted at a given gear ratio to the output shaft. Conversely, rotation of the second ring gear member due to rotation of the output shaft causes the external-teeth gear member to be rotated around the rotator, and the rotation of the external-teeth gear member is transmitted to the input shaft via the first ring gear member, so that the rotary motion and torque of the output shaft are transmitted at a given gear ratio to the input shaft.

In the steering control system of the type in which the stator of the electric motor of the variable transmission ratio device is fixed to the vehicle body, if the external-teeth gear member becomes not able to rotate relative to the rotator due to, for example, entry of foreign matter, the external-teeth gear member cannot rotate at all when the locking device is switched to the lock-on state in which rotation of the rotor and the rotator is inhibited. As a result, the rotary motion and torque cannot be transmitted between the input shaft and the output shaft, and it becomes impossible to perform turning operations on the steering wheel and turn or steer the steerable road wheels.

To avoid the situation as described above, it may be necessary to provide a special safety device that permits rotation of the rotator when high torque is applied to the rotator, even if the locking device is switched to the lock-on state in a situation where the external-teeth gear member cannot rotate relative to the rotator. The provision of the safety device may inevitably complicate the structure of the steering control system or increase the cost of the steering control system.

SUMMARY OF THE INVENTION

The invention provides a steering control system that is able to transmit rotary motion and torque between the input shaft and the output shaft, thereby to permit turning operations on the steering wheel and turning or steering of steerable road wheels, even when the locking device is switched to the lock-on state in a situation where the external-teeth gear member cannot rotate relative to the rotator due to, for example, entry of foreign matter, without requiring a special safety device that would complicate the structure of the steering control system and increase the cost thereof.

A first aspect of the invention relates to a vehicle steering control system including an input shaft that is rotatably supported and connected to a steering wheel so as not to be rotatable relative to the steering wheel, an output shaft that is rotatably supported and connected to a steerable-wheel side, a motion conversion mechanism that converts rotary motion of the output shaft into a motion that changes a steering angle of steerable wheels, a variable transmission ratio device operable to rotate the output shaft relative to the input shaft so as to change a transmission ratio as a ratio of the amount of rotary motion of the output shaft to the amount of rotary motion of the input shaft, and a locking device that is switched between a lock-on state in which the transmission ratio between the input shaft and the output shaft is inhibited from being changed, and a lock-off state in which the transmission ratio between the input shaft and the output shaft is allowed to be changed. In this system, the variable transmission ratio device has an electric motor and a speed reduction mechanism, and the electric motor includes a stator, and a rotor that is driven by rotor driving torque generated from interactions between the stator and the rotor and is rotated relative to the stator. The speed reduction mechanism includes a first ring gear member that rotates with the input shaft, a second ring gear member that rotates with the output shaft, an elliptic rotator that rotates with the rotor, and a band-like external-teeth gear member that is mounted around the rotator and is rotatable relative to the rotator. The external-teeth gear member meshes with the first ring gear member and the second ring gear member at positions corresponding to the long diameter of an ellipse of the rotator, and the number of teeth of the external-teeth gear member is equal to the number of teeth of one of the first ring gear member and the second ring gear member and different from the number of teeth of the other of the first ring gear member and the second ring gear member. The rotator is adapted to be driven by the electric motor and rotated relative to the input shaft so as to change the transmission ratio. In this steering control system, the stator is fixed to a vehicle body, and the locking device inhibits the input shaft and the rotor from rotating relative to each other when placed in the lock-on state, and allows the input shaft and the rotor to rotate relative to each other when placed in the lock-off state.

In the steering control system according to the first aspect of the invention, while the stator of the electric motor is fixed to the vehicle body, the locking device inhibits the input shaft and the rotor from rotating relative to each other when it is placed in the lock-on state, and allows the input shaft and the rotor to rotate relative to each other when it is placed in the lock-off state, so that the input shaft, rotor and the rotator can rotate as a unit when the locking device is in the lock-on state. Accordingly, even when the locking device is switched to the lock-on state in a situation where the external-teeth gear member cannot rotate relative to the rotator due to, for example, entry of foreign matter, the rotary motion and torque can be surely transmitted between the external-teeth gear member that rotates together with the input shaft, rotor, and rotator, and the second ring gear member, whereby the rotary motion and torque can be surely transmitted between the input shaft and the output shaft.

According to the first aspect of the invention, there is no need to provide a special safety device that permits rotation of the rotator when high torque is applied to the rotator, even if the locking device is switched to the lock-on state in a situation where the external-teeth gear member cannot rotate relative to the rotator. Thus, otherwise possible complication of the structure of the steering control system and increase of the cost thereof can be surely avoided.

In the vehicle steering control system of the first aspect of the invention, the locking device may have an engaging member, an actuator that drives the engaging member, and an engaged member adapted to be engaged with the engaging member so as to inhibit the input shaft and the rotor from rotating relative to each other, and the actuator may be supported by one of the input shaft and the rotor while the engaged member may be supported by the other of the input shaft and the rotor.

With the above arrangement, the actuator drives the engaging member for engagement with the engaged member so that the locking device can be switched to the lock-on state, and drives the engaging member for disengagement from the engaged member so that the locking device can be switched to the lock-off state.

Also, the actuator may be supported by the input shaft, and may be actuated when control current is supplied from the vehicle body side to the actuator via a spiral cable whose inner end is supported by the input shaft.

With the above arrangement, control current is supplied from the vehicle body side to the actuator supported by the input shaft via the spiral cable. Thus, the control current can be supplied with reliability from the vehicle body side to the actuator, irrespective of the rotational position of the input shaft.

In the locking device as described above, the engaging member may be a lock lever formed integrally with the actuator, and the engaged member may be a lock holder supported by the rotor. The lock holder may have a plurality of recesses formed in an outer peripheral portion thereof, and the locking device may be placed in the lock-on state when a distal end of the lock lever is engaged in one of the recesses of the lock holder.

In another example of the locking device, the engaging member may be a movable friction member, and the engaged member may be a stationary friction member supported by the rotor. The locking device may be placed in the lock-on state when the movable friction member and the stationary friction member are frictionally engaged with each other. The locking device may include a compression coil spring that is disposed between the actuator and the movable friction member and biases the movable friction member toward the stationary friction member, and a tubular plunger fitted on the input shaft, and the movable friction member may be adapted to reciprocate along the input shaft via the plunger so that the locking device is switched between the lock-on state and the lock-off state.

Also, the electric motor may be disposed between the steering wheel and the speed reduction mechanism, and the locking device may be disposed between the steering wheel and the electric motor. The spiral cable may have the function of supplying control current to at least one electrical component provided on the steering wheel or the input shaft.

With the above arrangement, the spiral cable through which control current is supplied to electrical components provided on the steering wheel or the input shaft can also be used as the spiral cable through which control current is supplied to the actuator. Thus, the structure of the steering control system can be simplified, and the cost of the steering control system can be reduced, as compared with the case where a spiral cable through which control current is supplied to the actuator is provided in addition to the spiral cable through which control current is supplied to the electrical components.

In the above aspect of the invention, the number of teeth of the external-teeth gear member may be equal to the number of teeth of the second ring gear member, and may be different from the number of teeth of the first ring gear member.

Also, the number of teeth of the external-teeth gear member and the second ring gear member may be larger than the number of teeth of the first ring gear member.

Also, the actuator may be supported by the input shaft, and the engaged member may be supported by the rotor.

Also, the locking device may have a stationary friction member and a movable friction member, and may be placed in the lock-on state when these friction members frictionally engage with each other.

Also, the locking device may be switched to the lock-on state when an abnormality occurs in the variable transmission ratio device.

The input shaft may have a first disc portion formed at a lower end thereof to extend in a plane perpendicular to an axis thereof, and the output shaft may have a second disc portion formed at an upper end thereof to extend in a plane perpendicular to an axis thereof, and a cylindrical portion that extends upward from an outer edge portion of the second disc portion in a direction parallel to the axis. The first ring gear member may be fixed to an upper face of an outer edge portion of the first disc portion, and the second ring gear member may be fixed to the inside of an upper end portion of the cylindrical portion.

Furthermore, the first disc portion may be disposed inside the second disc portion and the cylindrical portion such that the first disc portion is rotatable about the axis.

A second aspect of the invention relates to a control method of a vehicle steering control system. The control method of a vehicle steering control system including an input shaft that is rotatably supported and connected to a steering wheel so as not to be rotatable relative to the steering wheel, an output shaft that is rotatably supported and connected to a steerable-wheel side, a motion conversion mechanism that converts rotary motion of the output shaft into a motion that changes a steering angle of steerable wheels, a variable transmission ratio device operable to rotate the output shaft relative to the input shaft so as to change a transmission ratio as a ratio of the amount of rotary motion of the output shaft to the amount of rotary motion of the input shaft, and a locking device that is switched between a lock-on state in which the transmission ratio between the input shaft and the output shaft is inhibited from being changed, and a lock-off state in which the transmission ratio between the input shaft and the output shaft is allowed to be changed, said variable transmission ratio device having an electric motor and a speed reduction mechanism, said electric motor including a stator, and a rotor that is driven by rotor driving torque generated from interactions between the stator and the rotor and is rotated relative to the stator, said speed reduction mechanism including a first ring gear member that rotates with the input shaft, a second ring gear member that rotates with the output shaft, an elliptic rotator that rotates with the rotor, and a band-like external-teeth gear member that is mounted around the rotator and is rotatable relative to the rotator, said external-teeth gear member meshing with the first ring gear member and the second ring gear member at positions corresponding to the long diameter of an ellipse of the rotator, the number of teeth of the external-teeth gear member being equal to the number of teeth of one of the first ring gear member and the second ring gear member and different from the number of teeth of the other of the first ring gear member and the second ring gear member, said rotator being adapted to be driven by the electric motor and rotated relative to the input shaft so as to change the transmission ratio, comprises a step of determining whether an abnormality that makes it impossible to perform normal control of the transmission ratio occurs in the variable transmission ratio device, a step of, in the case where the abnormality occurs, finishing control of the variable transmission ratio device, a step of switching the locking device to the lock-on state, and a step of inhibiting the input shaft and the rotor from rotating relative to each other, thereby to restrict relative rotation between the input shaft and the output shaft.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein.

DETAILED DESCRIPTION OF THE EMBODIMENTS

Some embodiments of the invention will be described in detail with reference to the accompanying drawings.

First Embodiment

Figure 1:
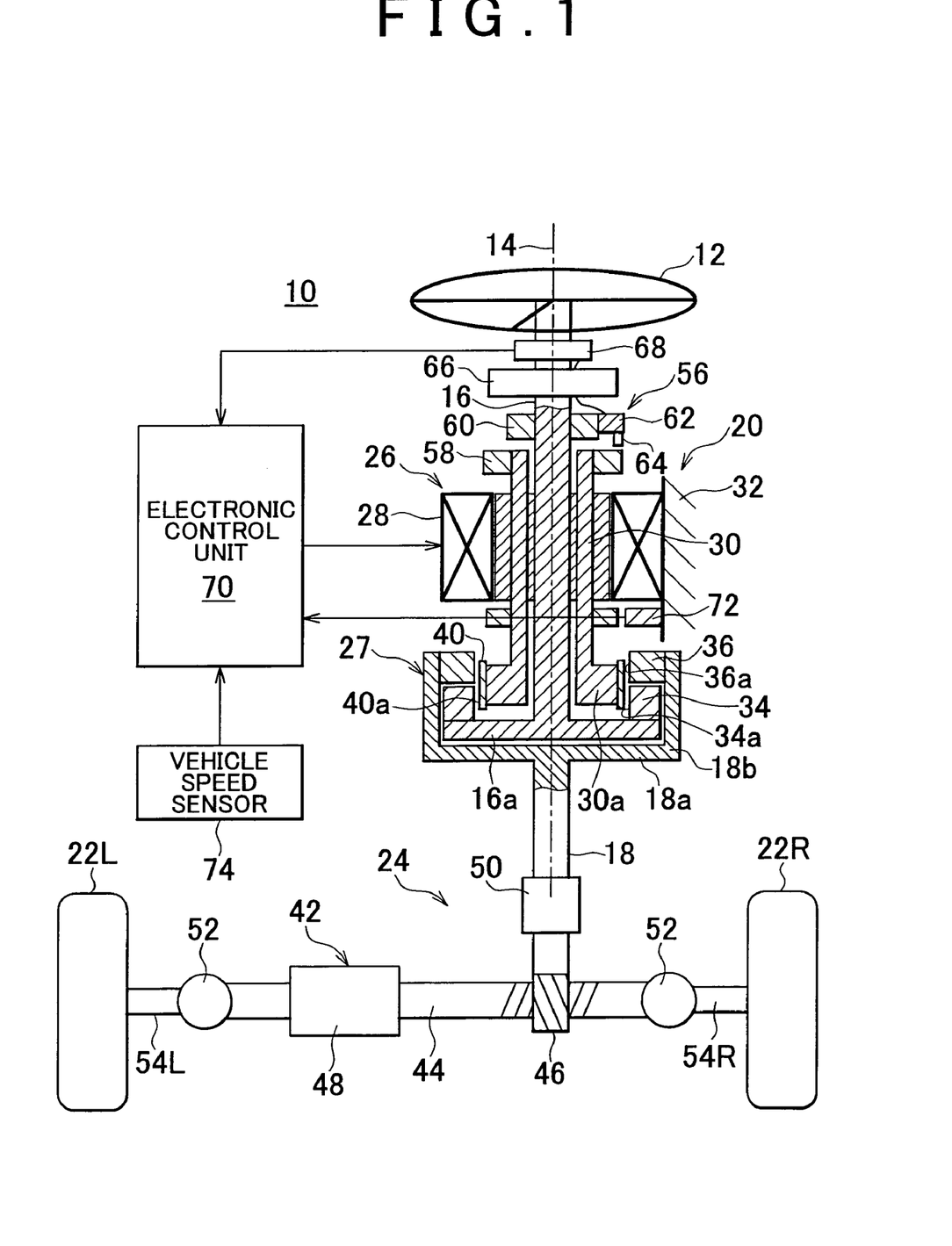
FIG. 1 is a schematic view showing the construction of a vehicle steering control system according to a first embodiment of the invention.
Figure 2:
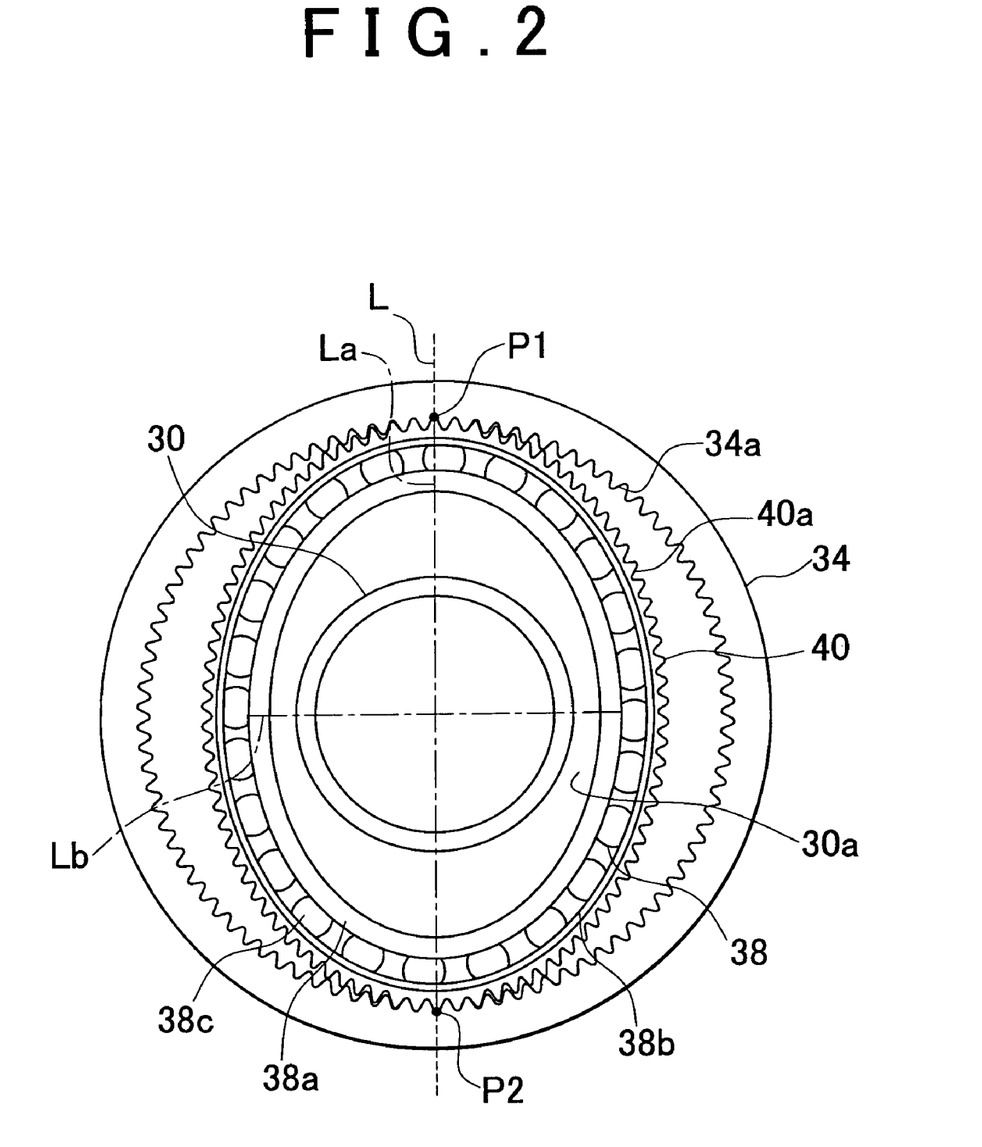
FIG. 2 is a cross-sectional view showing a strain wave gearing mechanism of a variable transmission ratio device as seen in a plane perpendicular to the axis of rotation thereof.

FIG. 1 is a schematic view showing the construction of a vehicle steering control system as a first embodiment of the invention. FIG. 2 is a cross-sectional view showing a strain wave gearing mechanism of a variable transmission ratio device as seen in a section perpendicular to the axis of rotation thereof. In FIG. 2, hatch patterns are not provided for the sake of brevity.

In FIG. 1, reference numeral 10 generally designates the steering control system. The steering control system 10 includes a steering wheel 12 that is turned by the driver of the vehicle, an upper steering shaft 16 as an input shaft supported rotatably about the axis of rotation 14, and a lower steering shaft 18 as an output shaft supported rotatably about the axis of rotation 14. The steering control system 10 further includes a variable transmission ratio device 20 operable to rotate the lower steering shaft 18 relative to the upper steering shaft 16 as needed so as to change the transmission ratio as the ratio of the amount of rotary motion of the lower steering shaft 18 to the amount of rotary motion of the upper steering shaft 16, and a motion conversion mechanism 24 operable to convert the rotary motion of the lower steering shaft 18 into motion that changes the steering angle of left and right front wheels 22L, 22R as steerable road wheels.

The upper steering shaft 16 is connected at its upper end to the steering wheel 12 via a torsion bar, and has a disc portion 16a formed at its lower end as an integral part thereof to extend in a plane perpendicular to the axis of rotation 14. The lower steering shaft 18 is formed integrally with a disc portion 18a that extends from the upper end of the shaft 18 in a plane perpendicular to the axis of rotation 14, and a cylindrical portion 18b that extends upward in parallel with the axis of rotation 14 from an outer edge of the disc portion 18a. The disc portion 18a and cylindrical portion 18b are spaced from the disc portion 16a, and thus loosely receive the disc portion 16a such that the disc portion 16a is rotatable about the axis of rotation 14.

The variable transmission ratio device 20 has an electric motor 26 and a reduction gear mechanism 27. The electric motor 26 is disposed around the upper steering shaft 16, between the steering wheel 12 and the disc portion 16a. The electric motor 26, which is a brushless motor, has a stator 28 including a plurality of electromagnetic coils, and a rotor 30 including a plurality of permanent magnets arranged in the circumferential direction thereof. In operation, rotor driving torque generated from electromagnetic interactions between the rotor 30 and the stator 28 is used to drive and rotate the rotor 30 relative to the stator 28. The stator 28 is fixed to a vehicle body 32 of the vehicle, and is supported by the vehicle body 32. The rotor 30 takes the form of a tube through which the upper steering shaft 16 is loosely inserted such that the rotor 30 is rotatable about the axis of rotation 14 relative to the upper steering shaft 16. The rotor 30 has a disc portion 30a formed at its lower end as an integral part thereof to extend in a plane perpendicular to the axis of rotation 14. The disc portion 30a is in the form of an ellipse having a long diameter La and a short diameter Lb, and functions as a rotator that rotates together with the rotor 30.

A ring gear member 34 having internal teeth 34a in the form of spur gears that extend in parallel with the axis of rotation 14 is fixed to the upper face of an outer edge portion of the disc portion 16a, and a ring gear member 36 having internal teeth 36a in the form of spur gears that extend in parallel with the axis of rotation 14 is fixed to the inner face of an upper end portion of the cylindrical portion 18b. The ring gear member 34 is spaced radially inwardly from the cylindrical portion 18b, and is also spaced from the ring gear member 36 in a direction parallel to the axis of rotation 14. The ring gear members 34 and 36 have the same pitch diameter, but have different numbers of teeth. In the first embodiment shown in FIG. 1, the ring gear member 34 has 100 teeth, and the ring gear member 36 has 102 teeth.

As shown in FIG. 2, the disc portion 30a is located at a position opposed to the ring gear members 34 and 36 in the radial directions, and a band-like external-teeth gear member 40 having external teeth 40a in the form of spur gears is provided at the outer periphery of the disc portion 30a via a bearing 38. The bearing 38 consists of inner race 38a and outer race 38b having flexibility, and a plurality of rollers 38c disposed between the inner and outer races 38a, 38b. The inner race 38a is press-fitted on the disc portion 30a so as not to rotate relative to the disc portion 30a. The external-teeth gear member 40, which has flexibility, is press-fitted on the outer race 38b of the bearing 38 so as not to rotate relative to the outer race 38b. With this arrangement, the bearing 38 and the external-teeth gear member 40 have elliptical profiles whose center lies on the axis of rotation 14. In the first embodiment as shown in FIGS. 1 and 2, the external-teeth gear member 40 has 102 teeth.

Also as shown in FIG. 2, the external-teeth gear member 40 meshes with the ring gear members 34, 36 at two points of intersection P1, P2 at which the pitch circle of the ring gear members 34, 36 intersects a straight line L that matches the long diameter La of the disc portion 30a, but does not mesh with the ring gear members 34, 36 in regions other than the intersection points P1, P2. Since the outer race 38b and the external-teeth gear member 40 have flexibility, rotation of the disc portion 30a relative to the disc portion 16a and the cylindrical portion 18b about the axis of rotation 14 causes the intersection points P1 and P2 to rotate or move about the axis of rotation 14 by the same angle as that of relative rotation of the disc portion 30a.

Thus, the ring gear members 34, 36 and external-teeth gear member 40 cooperate with the disc portion 30a and bearing 38 to constitute the reduction gear mechanism 27 in the form of a strain wave gearing mechanism. The disc portion 30a and bearing 38a function as a so-called wave generator of the strain wave gearing mechanism. The function of the stain wave gearing mechanism will be generally explained below, though it is well known in the art to which the invention pertains.

When the disc portion 30a rotates in the clockwise direction about the axis of rotation 14, relative to the disc portion 16a and the cylindrical portion 18b, as viewed from the bottom thereof, the positions at which the external-teeth gear member 40 and the ring gear member 34 mesh with each other rotate or move in the clockwise direction about the axis of rotation 14, in accordance with the relative rotation of the disc portion 30a. As described above, the number of teeth (102) of the external-teeth gear member 40 is larger than the number of teeth (100) of the ring gear member 34. Accordingly, while the disc portion 30a rotates 360° about the axis of rotation 14 relative to the ring gear member 34, the external-teeth gear member 40 rotates relative to the disc portion 30a thereby to rotate relative to the ring gear member 34 in the counterclockwise direction by an angle corresponding to two teeth.

When the disc portion 30a rotates in the clockwise direction relative to the ring gear member 36, the positions at which the external-teeth gear member 40 and the ring gear member 36 mesh with each other rotate or move in the clockwise direction about the axis of rotation 14, in accordance with the relative rotation of the disc portion 30a. As described above, the number of teeth (102) of the external-teeth gear member 40 is equal to the number of teeth (102) of the ring gear member 36. Accordingly, even when the disc portion 30a rotates 360° about the axis of rotation 14 relative to the ring gear member 36, the external-teeth gear member 40 does not rotate relative to the ring gear member 36.

With the above arrangement, when the rotor 30 having the disc portion 30a as its integral part rotates by angle θ in the clockwise direction relative to the upper steering shaft 16, the lower steering shaft 18 is rotated in the clockwise direction relative to the upper steering shaft 16 by angle θ/N obtained by multiplying the angular ratio 1/N (N=51 in the first embodiment) corresponding to the two teeth of the ring gear member 36 by angle θ with respect to 360°. Similarly, when the rotor 30 rotates by angle θ in the counterclockwise direction relative to the upper steering shaft 16, the lower steering shaft 18 is rotated by angle θ/N in the counterclockwise direction relative to the upper steering shaft 16.

Thus, the variable transmission ratio device 20 rotates the rotor 30 relative to the upper steering shaft 16 by means of the electric motor 26 and the reduction gear mechanism 27, thereby to rotate the lower steering shaft 18 relative to the upper steering shaft 16. In this manner, the variable transmission ratio device 20 changes the transmission ratio as the ratio of the amount of rotary motion of the lower steering shaft 18 to the amount of rotary motion of the upper steering shaft 16.

When the rotor 30 does not rotate relative to the upper steering shaft 16 (θ=0), the lower steering shaft 18 does not rotate relative to the upper steering shaft 16. Namely, the rotor 30, upper steering shaft 16 and lower steering shaft 18 do not rotate relative to one another, and these steering shafts rotate as if a single shaft rotates.

The rotary motion of the steering shaft 18 is converted by the motion conversion mechanism 24 into a motion that changes the steering angle of the left and right front wheels 22L, 22R. The motion conversion mechanism 24 employed in the first embodiment shown in FIG. 1 includes a rack-and-pinion type motor-driven power steering device 42, and the power steering device 42 has a rack bar 44 that extends in the lateral direction of the vehicle and a pinion shaft 46 that engages the rack teeth of the rack bar 44.

The power steering device 42 includes an actuator 48 having an electric motor and a speed reducer, and the actuator 48 applies assist force to the rack bar 44 in the axial direction, as well known in the art, so that the steering-related burden on the driver is reduced. The lower steering shaft 18 is connected at its lower end to the pinion shaft 46 via a universal joint 50. In operation, the rotary motion of the lower steering shaft 18 is transmitted as it is to the pinion shaft 46 via the universal joint 50, and the rotary motion of the pinion shaft 46 is converted into a linear motion of the rack bar 44. The actuator 48 may be arranged to apply assist torque to the lower steering shaft 18 or the pinion shaft 46.

The rack bar 44 is connected at its opposite ends to the inner ends of left and right tie rods 54L, 54R via ball joints 52, and the outer ends of the tie rods 54L, 54R are connected to knuckle arms (not shown) of the left and right steerable wheels 22L and 22R, respectively, via ball joints (not shown). With this arrangement, the linear motion of the rack bar 44 is converted into swing motion about the king pins of the left and right front wheels 22L and 22R, as well known in the art, namely, is converted into steering-angle changing motion.

As shown in FIG. 1, a lever-type locking device 56 is provided between the steering wheel 12 and the variable transmission ratio device 20, and the locking device 56 is arranged to inhibit the upper steering shaft 16 and the rotor 30 from rotating relative to each other as needed. In the first embodiment as shown in FIG. 1, the locking device 56 has a lock holder 58 as an engaged member that is fixed to the outside of the upper end of the rotor 30 by, for example, press fitting, an electromagnetic lock actuator 62 attached to a mount 60 that is fixed to the upper steering shaft 16, and a lock lever 64 as an engaging member that is formed integrally with the lock actuator 62 and is adapted to be driven by the lock actuator 62.

A plurality of recesses are formed in the outer peripheral portion of the lock holder 58 such that the recesses are spaced from each other in the circumferential direction and are open radially outward. The lock lever 64 is pivotably supported by a pivot (not shown), and its distal end may be engaged in one of the recesses of the lock holder 58 so that the lock lever 64 takes the locked position, while its distal end may be disengaged or released from the recess of the lock holder 58 so that the lock lever 64 takes the unlocked position. The lock actuator 62 includes a solenoid that drives the lock lever 64. The lock lever 64 is placed in the locked position when control current is not applied to the solenoid of the lock actuator 62, and is placed in the unlocked position when control current is applied to the solenoid.

In the locking device 56 as described above, control current applied to the solenoid of the lock actuator 62 is controlled so that the locking device 56 is switched between a lock-on state in which the device 56 inhibits the upper steering shaft 16 and the rotor 30 from rotating relative to each other, and a lock-off state in which the device 56 allows the upper steering shaft 16 and the rotor 30 to rotate relative to each other. When the locking device 56 is placed in the lock-on state, the upper steering shaft 16 and the rotor 30 cannot rotate relative to each other, and therefore the ring gear member 34 and the external-teeth gear member 40 rotate as a unit. Since the number of teeth of the ring gear member 36 is equal to that of the external-teeth gear member 40, these gear members rotate by the same angle in the same direction. As a result, the upper steering shaft 16 and the lower steering shaft 18 do not rotate relative to each other, but rotate as if a single shaft rotates.

A spiral cable device 66 having a known structure is provided between the steering wheel 12 and the locking device 56. The upper steering shaft 16 supports the inner end of a cable of the spiral cable device 66, and the vehicle body 32 supports the outer end of the cable, such that the spiral cable device 66 supplies control current from the vehicle body 32 side to the lock actuator 62 irrespective of the rotational position of the upper steering shaft 16. The spiral cable device 66 also supplies necessary control current to electrical/electronic components, such as an air bag and various switches, provided on the steering wheel 12.

A steering angle sensor 68 is provided between the steering wheel 12 and the spiral cable device 66. The steering angle sensor 68 detects the steering angle θs, and sends a signal indicative of the steering angle θs to an electronic control unit 70 provided on the vehicle body 32 via the spiral cable device 66. The steering angle sensor 68 is an absolute-type rotary encoder, and is arranged to detect the angle of rotation of the upper steering shaft 16 relative to the vehicle body 32, as the steering angle θs.

A rotational angle sensor 72 is provided between the electric motor 26 and the strain wave gearing mechanism. The rotation angle sensor 72, which is an incremental-type rotary encoder, is arranged to detect the amount of change Δθm of rotational angle as the amount of change of the rotational angle θm of the rotor 30 relative to the vehicle body 32, and send a signal indicative of the detected amount of change Δθm of the rotational angle to the electronic control unit 70. The rotational angle sensor 72 serves to detect the amount of operation of the variable transmission ratio device 20, namely, the angle of relative rotation between the upper steering shaft 16 and the lower steering shaft 18. Thus, a rotational angle sensor that detects the rotational angle of the lower steering shaft 18 may be provided in place of the rotational angle sensor 72 or in addition to the rotational angle sensor 72.

The electronic control unit 70 receives a signal indicative of the vehicle speed V from a vehicle speed sensor 74 installed on the vehicle, in addition to the signal indicative of the steering angle θs detected by the steering angle sensor 68 and the signal indicative of the amount of change Δθm of the rotational angle of the rotor 30 detected by the rotational angle sensor 72.

The electronic control unit 70 computes a target amount of change Δθmt of the rotational angle of the rotor 30 corresponding to a target steering gear ratio Rgt based on the vehicle speed V, and controls the electric motor 26 of the variable transmission ratio device 20 so that the amount of change Δθm of the rotational angle detected by the rotational angle sensor 72 becomes equal to the target amount of change Δθmt of the rotational angle. With the electric motor 26 thus controlled, the lower steering shaft 18 is rotated relative to the upper steering shaft 16 so that the steering gear ratio becomes equal to the target steering gear ratio. It is to be understood that the control of the steering gear ratio or the steering angle of the steerable road wheels through the control of the variable transmission ratio device 20 does not provide the subject matter of the invention, but may be performed in any manner known in the relevant art.

The electronic control unit 70 has CPU, ROM, RAM and an input/output port device, and is formed by a microcomputer in which these components are connected to each other via a bidirectional common bus, and suitable drive circuits. A power supply circuit of the electronic control unit 70 has a relay, and is able to supply electric power to the microcomputer, drive circuits and others for a while even after the ignition switch is opened.

If the ignition switch is closed, the electronic control unit 70 starts applying control current to the solenoid of the lock actuator 62 of the locking device 56 prior to control of the variable transmission ratio device 20, so as to switch the locking device 56 to the lock-off state. If the ignition switch is opened, the electronic control unit 70 finishes control of the variable transmission ratio device 20, and then finishes application of control current to the solenoid of the lock actuator 62 of the locking device 56 so as to switch the locking device 56 to the lock-on state.

The electronic control unit 70 checks if an abnormality that makes it impossible to perform normal control of the transmission ratio occurs in, for example, the variable transmission ratio device 20. If the electronic control unit 70 determines that such an abnormality occurs in, for example, the variable transmission ratio device 20, it actuates an alarm device (not shown), finishes control of the variable transmission ratio device 20, and finishes application of control current to the solenoid of the lock actuator 62 of the locking device 56 so as to switch the locking device 56 to the lock-on state. The determination as to whether an abnormality occurs does not provide the subject matter of the invention, but may be carried out in a manner known in the relevant art.

Although not illustrated in FIG. 1, a torque sensor is provided between the steering wheel 12 and the spiral cable device 66, and the spiral cable device 66 supplies necessary current to the torque sensor, and also sends a signal indicative of steering torque Ts detected by the torque sensor to an electronic control unit for assist torque control. The electronic control unit for assist torque control computes target assist torque Tat based on the steering torque Ts and the vehicle speed V, and controls the actuator 48 of the power steering device 42 based on the target assist torque Tat.

In the first embodiment constructed as described above, when the steering control system 10 is in a normal operating condition, the variable transmission ratio device 20 is controlled while the locking device 56 is kept in the lock-off state, so as to rotate the lower steering shaft 18 relative to the upper steering shaft 16 as needed so that the steering gear ratio becomes equal to the target steering gear ratio.

When the steering control system 10 cannot operate normally, namely, when an abnormality occurs, on the other hand, control of the variable transmission ratio device 20 is finished, and the locking device 56 is switched to the lock-on state, so that the upper steering shaft 16 and the rotor 30 are brought into an integrally rotating condition, namely, the upper steering shaft 16 and the rotor 30 rotate as a unit. In this condition, if the steering wheel 12 is turned by the driver and the upper steering shaft 16 and the rotor 30 are driven and rotated, the external-teeth gear member 40 does not rotate relative to the disc portion 30a, but rotates together with the ring gear member 34. As a result, the rotary motion and torque are transmitted from the external-teeth gear member 40 to the ring gear member 36. Consequently, the rotary motion and torque are transmitted from the upper steering shaft 16 to the lower steering shaft 18 such that these shafts do not rotate relative to each other but rotate as a unit.

If turning force due to reaction force from the road surface is applied to the left and right front wheels 22L, 22R as steerable road wheels where the locking device 56 is in the lock-on state, the turning force is converted by the motion conversion mechanism 24 into rotary motion and torque, which are then transmitted to the lower steering shaft 18. Then, the rotary motion and torque of the lower steering shaft 18 are transmitted to the steering wheel 12 along a path opposite to that in the case where the steering wheel 12 is turned.

Second Embodiment

Figure 3:
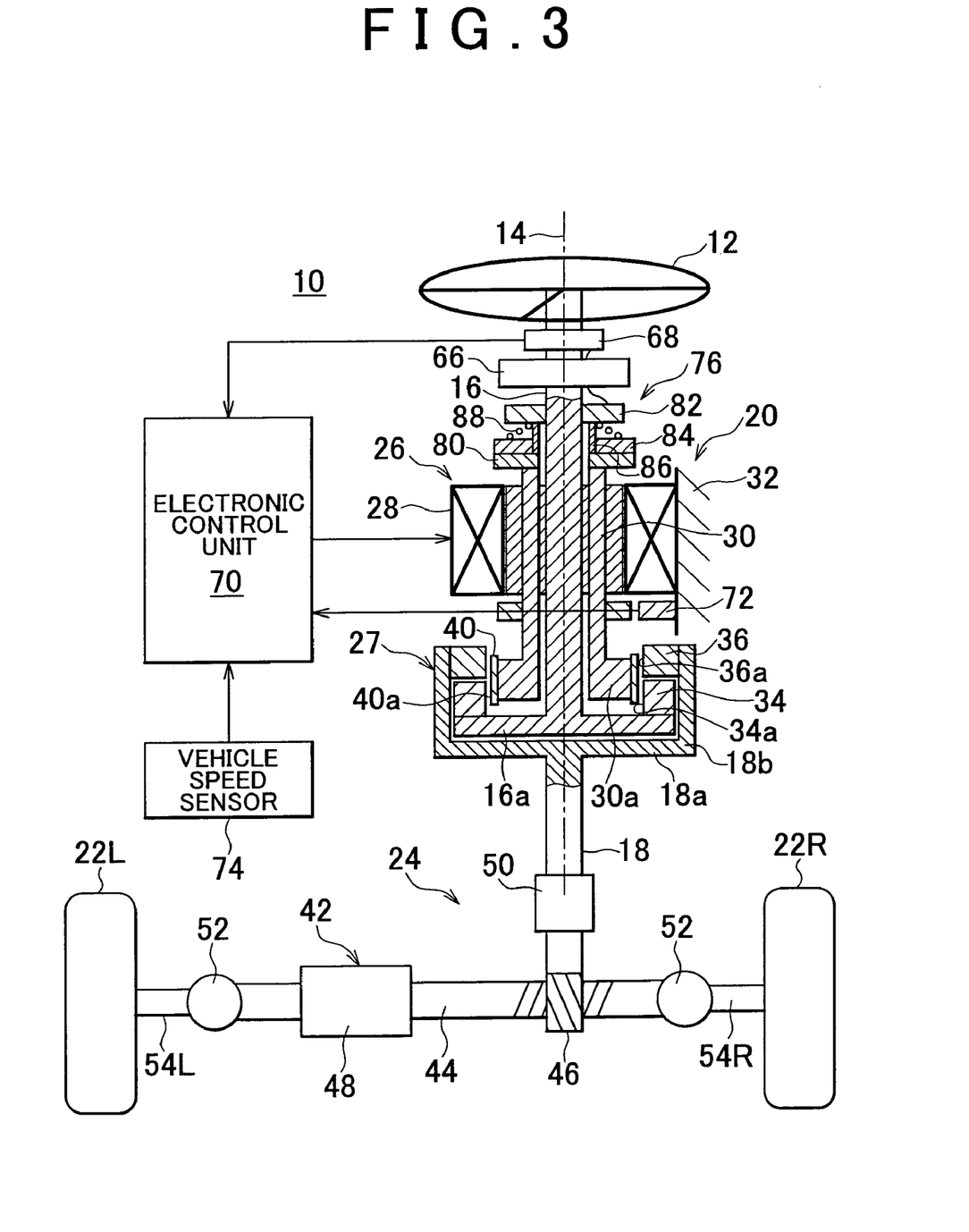
FIG. 3 is a schematic view showing the construction of a vehicle steering control system according to a second embodiment of the invention.

FIG. 3 is a schematic view showing the construction of a vehicle steering control system as a second embodiment of the invention. In FIG. 3, the same reference numerals as used in FIG. 1 are used for identifying the same members or elements as those shown in FIG. 1.

In the second embodiment, a clutch-type locking device 76 is provided between the steering wheel 12 and the variable transmission ratio device 20. Like the locking device 56 of the first embodiment as described above, the locking device 76 is operable to inhibit the upper steering shaft 16 and the rotor 30 from rotating relative to each other as needed. In the second embodiment as shown in FIG. 3, the locking device 76 has a stationary friction member 80 as an engaged member that is fixed to the upper end of the rotor 30, an electromagnetic lock actuator 82 fixed to the upper steering shaft 16, and a movable friction member 84 as an engaging member that is driven by the lock actuator 82.

The stationary friction member 80, lock actuator 82 and the movable friction member 84 have annular shapes, and are fitted on the upper steering shaft 16. More specifically, the lock actuator 82 actuates the movable friction member 84 via a tubular plunger 86 fitted on the upper steering shaft 16, so that the movable friction member 84 reciprocates along the axis of rotation 14. A compression coil spring 88 is elastically mounted between the lock actuator 82 and the movable friction member 84, such that the coil spring 88 extends around the plunger 86. The compression coil spring 88 biases the movable friction member 84 toward the stationary friction member 80.

The movable friction member 84 can take the locked position in which the friction member 84 is pressed against the stationary friction member 80 due to the spring force of the compression coil spring 88 and is integrally and frictionally engaged with the stationary friction member 80, and the unlocked position in which the friction member 84 is disengaged from the stationary friction member 80. The lock actuator 82 includes a solenoid that drives the plunger 86. The movable friction member 84 is placed in the locked position when control current is not applied to the solenoid, and is placed in the unlocked position when control current is applied to the solenoid. The control current is supplied from the vehicle body 32 side to the solenoid of the lock actuator 82 via the spiral cable device 66, and the supply of the control current is controlled by the electronic control unit 70.

With the control current applied to the solenoid of the lock actuator 82 thus controlled, the locking device 76 is switched between the lock-on state in which the upper steering shaft 16 and the rotor 30 are inhibited from rotating relative to each other, and the lock-off state in which the upper steering shaft 16 and the rotor 30 are allowed to rotate relative to each other. When the locking device 76 is in the lock-on state, the upper steering shaft 16 and the rotor 30 cannot rotate relative to each other, and therefore the ring gear member 34 and the external-teeth gear member 40 rotate as a unit. Since the number of teeth of the ring gear member 36 is equal to that of the external-teeth gear member 40, these gear members 36, 40 rotate by the same angle in the same direction. Accordingly, the upper steering shaft 16 and the lower steering shaft 18 do not rotate relative to each other, but rotate as a unit as if a single shaft rotates The vehicle steering control system of the second embodiment is similar in construction to that of the above-described first embodiment except for the locking device 76. Thus, the steering control system of the second embodiment operates similarly to that of the first embodiment as described above.

In the first and second embodiments as described above, when the locking device 56 or locking device 76 is in the lock-on state, and the steering wheel 12 is turned by the driver so that the upper steering shaft 16 and the rotor 30 are driven to be rotated, the external-teeth gear member 40 does not rotate relative to the disc portion 30a but rotates together with the ring gear member 34. Therefore, even if the locking device 56 is switched to the lock-on state in a situation where foreign matter enters between the external-teeth gear member 40 and the disc portion 30a and these members 40, 30a cannot rotate relative to each other, or even if foreign matter enters between the external-teeth gear member 40 and the disc portion 30a and these members 40, 30a cannot rotate relative to each other in a situation where the locking device 56 is in the lock-on state, the upper steering shaft 16 and the lower steering shaft 18 can rotate as a unit as if a single shaft rotates, thus ensuring a condition where the driver is able to turn the steerable road wheels with reliability at a given steering gear ratio.

In the first and second embodiment as described above, there is no need to provide a special safety device for permitting rotation of the upper steering shaft 16 and the lower steering shaft 18 even if the locking device 56 is switched to the lock-on state in a situation where foreign matter enters between the external-teeth gear member 40 and the disc portion 30a and these members 40, 30a cannot rotate relative to each other, or even if foreign matter enters between the external-teeth gear member 40 and the disc portion 30a and these members 40, 30a cannot rotate relative to each other in a situation where the locking device 56 is in the lock-on state. Since the special safety device is not necessary, the steering control system 10 can surely avoid problems, such as complication of the structure of the system 10 and increased cost of manufacturing.

In the first embodiment as described above, in particular, the locking device 56, which is a lever-type locking device, is able to reliably prevent the upper steering shaft 16 and the rotor 30 from rotating relative to each other even if great torque for relative rotation is applied to between the upper steering shaft 16 and the rotor 30.

In the second embodiment as described above, the locking device 76, which is a friction-clutch-type locking device, is able to prevent the upper steering shaft 16 and the rotor 30 from rotating relative to each other, without causing rattles in the direction of rotation.

In the first and second embodiments as described above, the ring gear member 36 and the external-teeth gear member 40 have the same number of teeth, and the number of teeth of the ring gear member 34 is smaller than that of these members 36, 40. With this arrangement, when the locking device 56 is in the lock-on state, the upper steering shaft 16 and the lower steering shaft 18 can be rotated as a unit without rotating relative to each other.

Alternatively, the ring gear member 34 and the external-teeth gear member 40 may have the same number of teeth, and the number of teeth of the ring gear member 36 may be different from that of these members 34, 40. In this case, however, if the upper steering shaft 16 and the lower steering shaft 18 are rotated in a condition where the locking device 56 is in the lock-on state, the upper steering shaft 16 and the lower steering shaft 18 rotate relative to each other at a gear ratio corresponding to the ratio of the numbers of teeth of the ring gear member 36 and the external-teeth gear member 40.

In the first and second embodiments as described above, while the lock actuator 62, 82 of the locking device 56 is supported by the upper steering shaft 16, control current is supplied from the vehicle body 32 side to the solenoid of the lock actuator 62, 82 via the spiral cable device 66. Thus, the control current can be supplied to the solenoid of the lock actuator 62, 82 with high reliability. Also, the spiral cable device 66 is arranged to supply necessary control current to electrical/electronic components, such as an air bag and various switches, provided on the steering wheel 12. It is thus possible to supply control current to the solenoid of the lock actuator 62, 82 by effectively utilizing the spiral cable device 66 for supplying necessary control current to the electrical/electronic components as described above, without requiring a dedicated spiral cable device used exclusively for supplying control current to the solenoid of the lock actuator 62, 82.

While particular embodiments of the invention have been described in detail above, it would be clear to those skilled in the art that the invention is not limited to the above-described embodiments, but may be implemented in various other embodiments within the scope of the invention.

In the illustrated embodiments, the ring gear member 34 has 100 teeth, and each of the ring gear member 36 and the external-teeth gear member 40 has 102 teeth. However, these gear members may have any number of teeth provided that the number of teeth of the external-teeth gear member 40 is equal to that of one of the ring gear members 34 and 36, and is different from that of the other of the ring gear members 34 and 36.

In the illustrated embodiments, control current is supplied to the solenoid of the lock actuator 62, 82 via the spiral cable device 66 that supplies necessary control current to electrical/electronic components, such as an air bag and various switches, provided on the steering wheel 12. However, the control current may be supplied to the solenoid of the lock actuator 62, 82 via another spiral cable device different from the spiral cable device that supplies necessary control current to electrical/electronic components, such as an air bag and various switches.

In the illustrated embodiments, the lock actuator 62, 82 of the locking device 56, 76 is supported by the upper steering shaft 16, and the lock holder 58 or stationary friction member 80 as an engaged member is fixed to the upper end of the rotor 30. However, the lock actuator 62, 82 may be supported by the upper end of the rotor 30, and the lock holder 58 or stationary friction member 80 as an engaged member may be fixed to the upper steering shaft 16.

While the invention has been described with reference to what are considered to be embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the invention.

The invention claimed is:

1. A vehicle steering control system comprising:
   an input shaft that is connected to a steering wheel so as not to be rotatable relative to the steering wheel;
   an output shaft that is connected to a steerable-wheel side;
   a motion conversion mechanism that converts rotary motion of the output shaft into a motion that changes a steering angle of steerable wheels;

a variable transmission ratio device operable to rotate the output shaft relative to the input shaft so as to change a transmission ratio as a ratio of the amount of rotary motion of the output shaft to the amount of rotary motion of the input shaft;

a locking device that is switched between a lock-on state in which the transmission ratio between the input shaft and the output shaft is inhibited from being changed, and a lock-off state in which the transmission ratio between the input shaft and the output shaft is allowed to be changed; and a control unit that controls a control current that is applied to the locking device so that the locking device is switched between the lock-on state and the lock-off state, wherein the variable transmission ratio device includes an electric motor and a speed reduction mechanism, and the electric motor includes a stator, and a rotor that is driven by rotor driving torque generated from interactions between the stator and the rotor and is rotated relative to the stator;

the speed reduction mechanism includes a first ring gear member that rotates with the input shaft, a second ring gear member that rotates with the output shaft, an elliptic rotator that rotates with the rotor, and a band-like external-teeth gear member that is mounted around the rotator and is rotatable relative to the rotator, and the external-teeth gear member meshes with the first ring gear member and the second ring gear member at positions corresponding to the long diameter of an ellipse of the rotator, the number of teeth of the external-teeth gear member being equal to the number of teeth of one of the first ring gear member and the second ring gear member and different from the number of teeth of the other of the first ring gear member and the second ring gear member, the rotator being adapted to be driven by the electric motor and rotated relative to the input shaft so as to change the transmission ratio;

the stator is fixed to a vehicle body; and the locking device inhibits the input shaft and the rotor from rotating relative to each other when placed in the lock-on state, and allows the input shaft and the rotor to rotate relative to each other when placed in the lock-off state.

2. The vehicle steering control system according to claim 1, wherein the locking device includes an engaging member, an actuator that drives the engaging member, and an engaged member adapted to be engaged with the engaging member so as to inhibit the input shaft and the rotor from rotating relative to each other, and the actuator is supported by one of the input shaft and the rotor while the engaged member is supported by the other of the input shaft and the rotor.

3. The vehicle steering control system according to claim 2, wherein the actuator is supported by the input shaft, and is actuated when a control current is supplied from the vehicle body side to the actuator via a spiral cable whose inner end is supported by the input shaft.

4. The vehicle steering control system according to claim 3, wherein the engaging member includes a lock lever formed integrally with the actuator, and the engaged member comprises a lock holder supported by the rotor, the lock holder including a plurality of recesses formed in an outer peripheral portion thereof, the locking device being placed in the lock-on state when a distal end of the lock lever is engaged in one of the recesses of the lock holder.

5. The vehicle steering control system according to claim 3, wherein the engaging member includes a movable friction member, and the engaged member comprises a stationary friction member supported by the rotor, the locking device being placed in the lock-on state when the movable friction member and the stationary friction member are frictionally engaged with each other.

6. The vehicle steering control system according to claim 5, wherein the locking device includes a compression coil spring that is disposed between the actuator and the movable friction member and biases the movable friction member toward the stationary friction member, and a tubular plunger fitted on the input shaft, the movable friction member being adapted to reciprocate along the input shaft via the plunger so that the locking device is switched between the lock-on state and the lock-off state.

7. The vehicle steering control system according to claim 3, wherein the electric motor is disposed between the steering wheel and the speed reduction mechanism, and the locking device is disposed between the steering wheel and the electric motor.

8. The vehicle steering control system according to claim 3, wherein the control current is supplied to at least one electrical component provided on the steering wheel or the input shaft via the spiral cable.

9. The vehicle steering control system according to claim 1, wherein the number of teeth of the external-teeth gear member is equal to the number of teeth of the second ring gear member, and the number of teeth of the first ring gear member is smaller than the number of teeth of the second ring gear member.

10. The vehicle steering control system according to claim 1, wherein the number of teeth of the external-teeth gear member is equal to the number of teeth of the first ring gear member, and the number of teeth of the first ring gear member is different from the number of teeth of the second ring gear member.

11. The vehicle steering control system according to claim 1, wherein the locking device is switched to the lock-on state when an abnormality occurs in the variable transmission ratio device.

12. The vehicle steering control system according to claim 1, wherein:

the input shaft includes a first disc portion formed at a lower end thereof to extend in a plane perpendicular to an axis thereof;

the output shaft includes a second disc portion formed at an upper end thereof to extend in a plane perpendicular to an axis thereof, and a cylindrical portion that extends upward from an outer edge portion of the second disc portion in a direction parallel to the axis;

the first ring gear member is fixed to an upper face of an outer edge portion of the first disc portion; and the second ring gear member is fixed to the inside of an upper end portion of the cylindrical portion.

13. The vehicle steering control system according to claim 12, wherein the first disc portion is disposed inside the second disc portion and the cylindrical portion such that the first disc portion is rotatable about the axis.

14. A control method of a vehicle steering control system including an input shaft that is rotatably supported and connected to a steering wheel so as not to be rotatable relative to the steering wheel, an output shaft that is rotatably supported and connected to a steerable-wheel side, a motion conversion mechanism that converts rotary motion of the output shaft into a motion that changes a steering angle of steerable wheels, a variable transmission ratio device operable to rotate the output shaft relative to the input shaft so as to change a transmission ratio as a ratio of the amount of rotary motion of the output shaft to the amount of rotary motion of the input shaft, a locking device that is switched between a lock-on state in which the transmission ratio between the input shaft and the output shaft is inhibited from being changed, and a lock-off state in which the transmission ratio between the input shaft and the output shaft is allowed to be changed, and a control unit that controls a control current that is applied to the locking device so that the locking device is switched between the lock-on state and the lock-off state, in which the variable transmission ratio device includes an electric motor and a speed reduction mechanism, the electric motor includes a stator, and a rotor that is driven by rotor driving torque generated from interactions between the stator and the rotor and is rotated relative to the stator, the speed reduction mechanism includes a first ring gear member that rotates with the input shaft, a second ring gear member that rotates with the output shaft, an elliptic rotator that rotates with the rotor, and a band-like external-teeth gear member that is mounted around the rotator and is rotatable relative to the rotator, the external-teeth gear member meshes with the first ring gear member and the second ring gear member at positions corresponding to the long diameter of an ellipse of the rotator, the number of teeth of the external-teeth gear member is equal to the number of teeth of one of the first ring gear member and the second ring gear member and different from the number of teeth of the other of the first ring gear member and the second ring gear member, the rotator is adapted to be driven by the electric motor and rotated relative to the input shaft so as to change the transmission ratio, and the stator is fixed to the vehicle body, the method comprising:

determining whether an abnormality that makes it impossible to perform normal control of the transmission ratio occurs in the variable transmission ratio device;

in a case the abnormality occurs, finishing control of the variable transmission ratio device;

switching the locking device to the lock-on state; and inhibiting the input shaft and the rotor from rotating relative to each other, thereby to restrict relative rotation between the input shaft and the output shaft.

* * * * *